United States Patent [19]

McMaster

[11] Patent Number: 4,876,445
[45] Date of Patent: Oct. 24, 1989

[54] INTRUSION DETECTION DEVICE WITH EXTENDED FIELD OF VIEW

[75] Inventor: Richard L. McMaster, Pittsford, N.Y.

[73] Assignee: Nvtek Security Products, Inc., Fairport, N.Y.

[21] Appl. No.: 194,335

[22] Filed: May 16, 1988

[51] Int. Cl.⁴ .............................................. G01V 9/04
[52] U.S. Cl. .............................. 250/221; 250/203 R; 340/567
[58] Field of Search ............... 250/203 R, 203 S, 221, 250/222.1, 342, 353; 340/567

[56] References Cited

U.S. PATENT DOCUMENTS

| | | | |
|---|---|---|---|
| 3,958,118 | 5/1976 | Schwarz | 340/567 |
| 4,268,752 | 5/1981 | Herwig et al. | 250/353 |
| 4,442,359 | 4/1984 | Lederer | 250/342 |
| 4,644,147 | 2/1987 | Zublin | 250/221 |
| 4,703,171 | 10/1987 | Dahl et al. | 250/221 |
| 4,709,151 | 11/1987 | Guscott et al. | 250/342 |
| 4,717,821 | 1/1988 | Messiou | 250/221 |

Primary Examiner—David C. Nelms
Assistant Examiner—Eric F. Chatmon

[57] ABSTRACT

An intrusion detection device which has an optically extended field of view substantially greater than 180 degrees is disclosed. The intrusion detection device includes a radiation sensor and an optical system for concentrating radiation onto the sensor from each of a plurality of discrete fields of view extending over a predetermined arc greater than 180 degrees. A lens system has a plurality of segments each with its own field of view. Reflectors within the field of view of each of a plurality of the lens segments are oriented to gather radiation from a predetermined field of view outside the field of view of the lens system and to reflect the gathered radiation onto the associated lens segment to be concentrated onto the sensor. Preferably, the segmented lens is a Fresnel lens system having an array of lens segments, each lens segment being angled with respect to the others so as to have its own discrete field of view, and each lens segment being positioned and angularly disposed with respect to the other lens segments so as to share a common focal point.

8 Claims, 7 Drawing Sheets

INTRUSION DETECTION DEVICE WITH EXTENDED FIELD OF VIEW

BACKGROUND OF THE INVENTION

1. Field of the Invention

The present invention relates to intrusion detection devices such as, for example, of the passive infrared type, and more particularly to wide angle optical systems for such.

2. Description of the Prior Art

Conventional intrusion detection devices commonly have passive infrared sensors which recognize changes in received infrared energy to indicate movement of a person into and within a field of view. However, these sensors can only cover an arc of about 60 degrees because passive infrared sensors are characterized by a lambertain distribution of sensitivity. In particular, manufacturers typically specify that the sensitivity decreases as the cosine of the angle from the optical axis. Thus, at an angle of 60 degrees from the optical axis, the sensitivity would be only 50 percent what it is at the center. Even if it were not for the lambertain distribution of sensitivity, the housing of commercially available sensors restrict the field of view. For Example, one such commercially available sensor has an enclosure restricting the field of view to 46 degrees from the optical axis, and another to 55 degrees.

One way to improve the effective field of view of an infrared sensor is to employ an optical system to direct the electromagnetic radiation emanating from any one of a plurality of discrete fields of view onto a single sensor, or closely spaced multiples of such sensors. For example, FIG. 1 shows a typical device having a Fresnel lens system with an array of lens segments tilted with respect to each other so as to have their own discrete fields of view, and so as to focus parallel radiation in that field of view on a common focal point so as to provide an infrared sensor located at the common focal point with a plurality of discrete, sector-shaped fields of view. As an infrared source moves into and out of these fields of view, a sudden change in the level of infrared radiation is detected by the sensor and a signal is generated to a controlled circuit. Even with such a lens system, and a sensor capable of a 90 degree field of view, the greatest angle which can be monitored is approximately 90 degrees because the angle of incidence of radiation on the sensor is approximately the same as the angle of incidence into the device, and because the standard sensor unit only supplies small signals when receiving radiation from a large angle of incidence. However, it is often desirable for many uses to be able to monitor a significantly larger angular range than 90 degrees.

Several attempts have been made to increase the effective field of view of intrusion detectors using reflective surfaces. For example, see U.S. Pat. No. 4,268,752 which issued on May 19, 1981 to Herwig et al, U.S. Pat. No. 4,644,147 which issued on Feb. 17, 1987 to Zublin, and U.S. Pat. No. 4,703,171 which issued on Oct. 27, 1987 to Dahl et al. Each patent describes an optical system for expanding the field of view of an intrusion detection device up to approximately 180 degrees. While such coverage is generally sufficient to monitor a single rectangular-shaped space, it is often desirable to be able to monitor larger angles so as, for example, to be able to cover an L-shaped area from the inside corner.

Additionally, each of these prior patents presents a unique problem overcome by the intrusion detection device according to the present invention. Herwig U.S. Pat. No. 4,268,752 has a significant obscurration of the field of view by a mirror, which is not used to extend or deflect the field of view. The system of Zublin U.S. Pat. No. 4,644,147 rotates the image in space before it impinges the sensors, and provides reflectors which are not readily accessable for the purpose of changing the fields of view. Kahl U.S. Pat. No. 4,703,171 has a 15 degree "dead" space along the optical axis.

SUMMARY OF THE INVENTION

It is an object of the present invention to provide an intrusion detection device which overcomes the above-mentioned problems and which has an optically extended field of view substantially greater than 180 degrees.

In accordance with the above, the present invention provides an intrusion detection device including a radiation sensor and an optical system for concentrating radiation onto the sensor from each of a plurality of discrete fields of view extending over a predetermined arc greater than 180 degrees. A preferred embodiment of the present invention includes a lens system having a plurality of segments each with its own field of view. Reflective means within the field of view of each of a plurality of the lens segments are oriented to gather radiation from a predetermined field of view outside the field of view of the lens system and to reflect the gathered radiation onto the associated lens segment to be concentrated onto the sensor.

In accordance with a preferred embodiment of the present invention, the segmented lens is a Fresnel lens system having an array of lens segments, each lens segment being angled with respect to the others so as to have its own discrete field of view, and each lens segment being positioned and angularly disposed with respect to the other lens segments so as to share a common focal point.

The invention and its various technical advantages will become apparent to those skilled in the art from the ensuing description, reference being made to the following drawings.

DETAILED DESCRIPTION OF THE PREFERRED EMBODIMENTS

Figure 1:
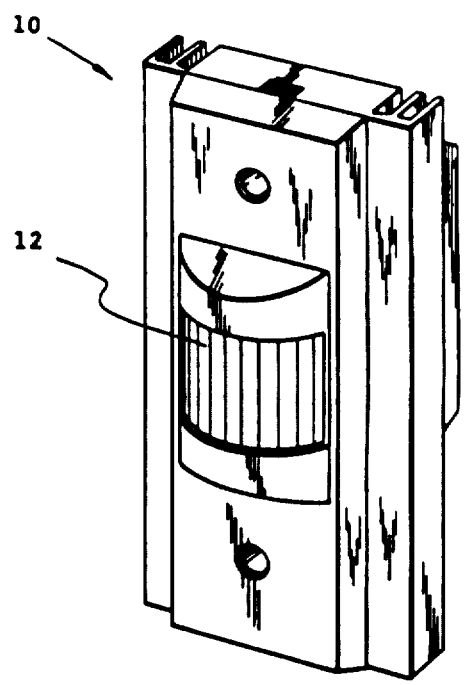
FIG. 1 is a perspective view of an infrared detector known in the prior art with a Fresnel lens system to provide an infrared detector with a plurality of discrete, sector-shaped fields of view.

Referring to FIG. 1, the prior art detector 10 shown includes a Fresnel lens system 12 comprising an array of contiguous lens segments. A Fresnel lens system has characteristics generally similar to a spherical lens, with light passing directly through the relatively perpendicular lens segment at the center of concentric circles, and light being bent to a greater extent in the concentric circles more remote from the center.

Figure 2:
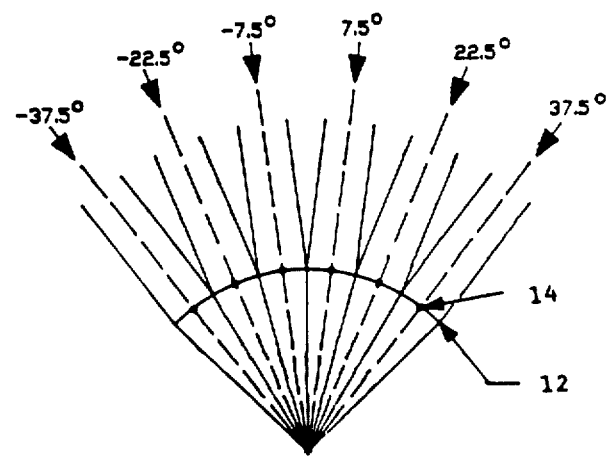
FIG. 2 is a layout of the optical path in the device of FIG. 1.
Figure 3:
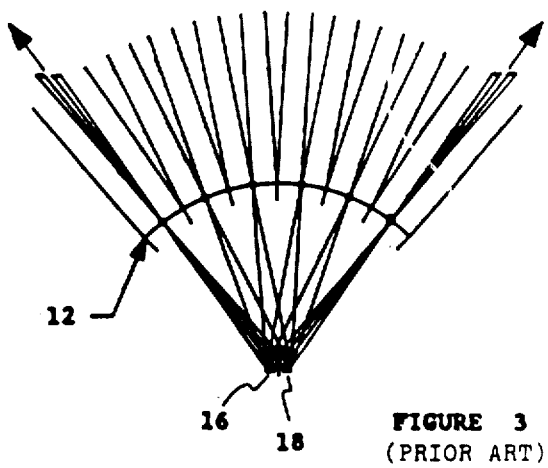
FIG. 3 is a more detailed layout of the optical path in the device of FIG. 1 showing the pattern and field of view limits for a pair of sensor elements.

FIG. 2 shows the optical arrangement for the prior art detector of FIG. 1. It shows the general placement and field of views for six lens segments of complete Fresnel lens system 12. A dot 14 marks the center line of each lens segment. It should be noted that in the present invention, the optical center of each lens segment need not be centered in, or even within, the lens segment. FIG. 3 is a more detailed view of the same apparatus showing the pattern and field of view limits for a pair of sensor elements 16 and 18, as is common in such devices. Note that the outer lens segments in FIGS. 2 and 3 are selected so that energy approaching the detector at an angle of 37.5 degrees will be bent such that it comes to focus at the sensor. As previously noted, the sensor has a sensitivity that drops off rapidly as the incident rays reach it at greater angles.

Figure 4:
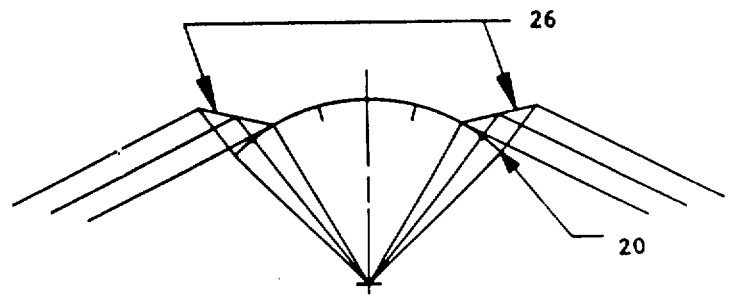
FIG. 4 is a layout of the optical system in accordance with an embodiment of the present invention.
Figure 5:
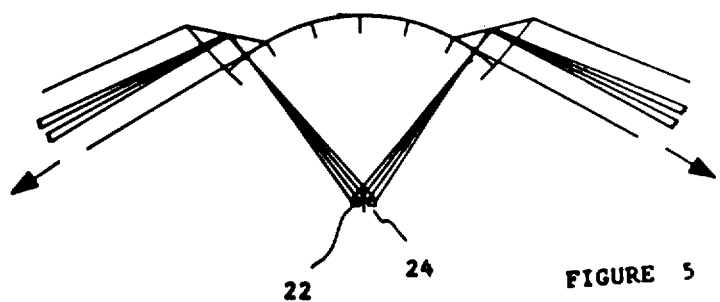
FIG. 5 is a more detailed view of the optical system of FIG. 4 showing the pattern and field of view limits for a pair of sensor elements.

To explain the present invention without confusing detail, FIGS. 4 and 5 illustrate the optical arrangements for only the outer lens segments of a six segment Fresnel lens system. FIG. 4 shows the general placement of six lens segments of a Fresnel lens system 20. FIG. 5 is a more detailed view of the same apparatus showing the pattern and field of view limits for a pair of sensor elements 22 and 24 through the outer two lens segments. Note that the configuration of lens segments in FIGS. 4 and 5 are identical to the configuration of the lens segments in FIGS. 2 and 3. That is, the segments are positioned so that energy approaching the detector at an angle of 37.5 degrees will be bent such that it comes to focus at the sensor. As such, the sensor in FIGS. 4 and 5 will have the same sensitivity to rays incident through the outer segments as will the sensor in FIGS. 2 and 3.

Reflecting means 26 have been provided to fold the optical axis of radiation approaching the detector from beyond the fields of view of the lens segments in such a manner that the radiation arrives at a lens segment at an angle within the segment's fields of view. Reflectors, when used on detectors having six-segment Fresnel lens systems, can extend the field of view of the lens to cover an overall angle approximately defined by a tangent line to the lens from the part of the reflector closest to the lens. In this example, approximately 120 degrees.

Figure 6:
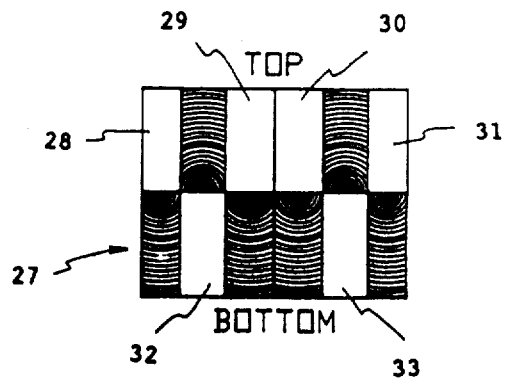
FIG. 6 is a view illustrating multiple lens segments using reflectors which cover alternating full lens segments for one-half the segment lengths.

Generally, one would not use reflectors only on the outer lens segments of the lens system, as this would leave gaps in the coverage of the detector. FIG. 6 is a view of a Fresnel lens system 27 laid flat and illustrating multiple lens segments using reflectors 28–33 which cover alternating full lens segments for one-half the segment lengths.

Figure 7A:
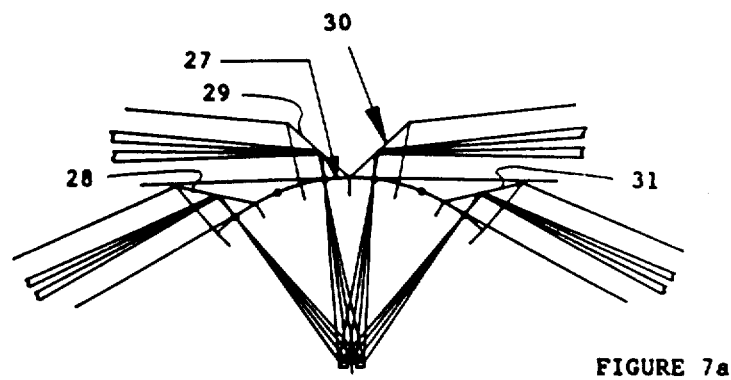
FIGS. 7a, 7b, 8a, and 8b illustrate the radiation patterns and fields of view limits of the lens segments of FIG. 6.
Figure 7B:
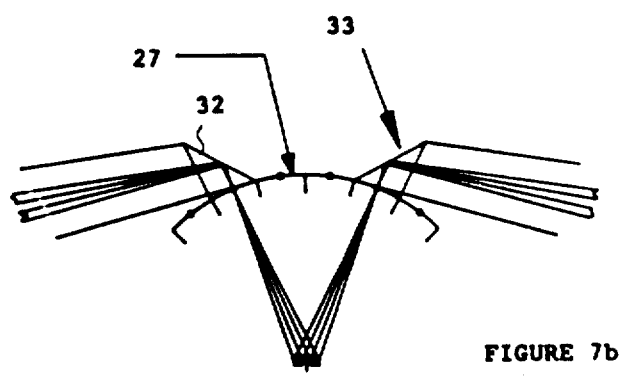
Figure 8A:
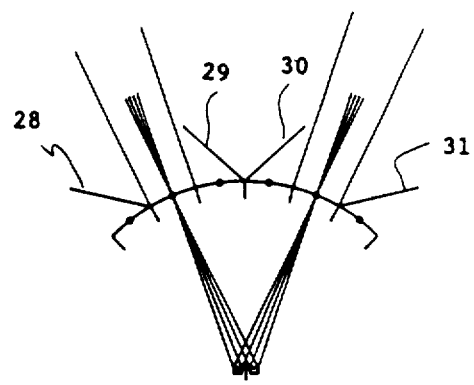
Figure 8B:
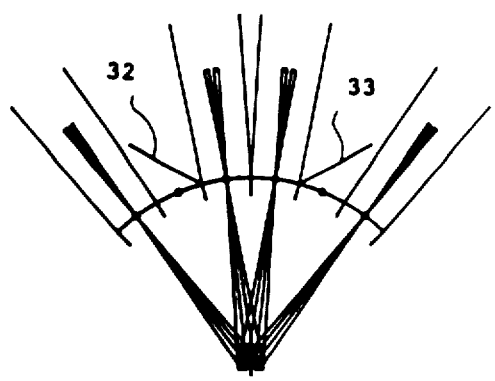

FIGS. 7a and 7b illustrate the radiation patterns and fields of view limits for the segments having deflected radiation patterns. FIG. 7a shows the top half of the lens system and FIG. 7b shows the bottom half of the lens system. FIGS. 8a and 8b illustrate the radiation patterns and fields of view limits for the segments having un-deflected radiation patterns. FIG. 8a shows the top half of the lens system and FIG. 8b shows the bottom half of the lens system. It will be apparent that combining the covered fields of FIGS. 7a, 7b, 8a, and 8b provides substantial inspection of the total 240 degree field of view.

Figure 9:
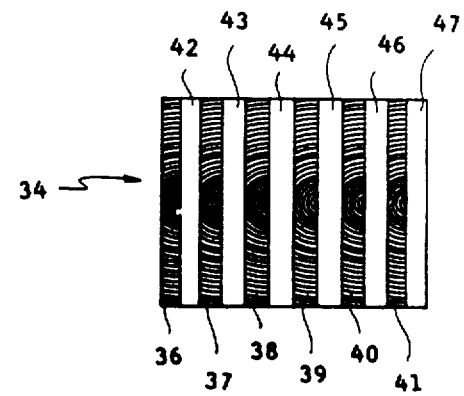
FIG. 9 is a view illustrating multiple lens segments using reflectors which cover half of each lens segment for the entire segment length.

FIG. 9 is a view of a Fresnel lens system 34 according to another embodiment of the present invention. The lens system is illustrated laid flat and and includes multiple lens segments 36–41 using reflectors 42–47 which cover half of each lens segment for the entire segment lengths.

Figure 10:
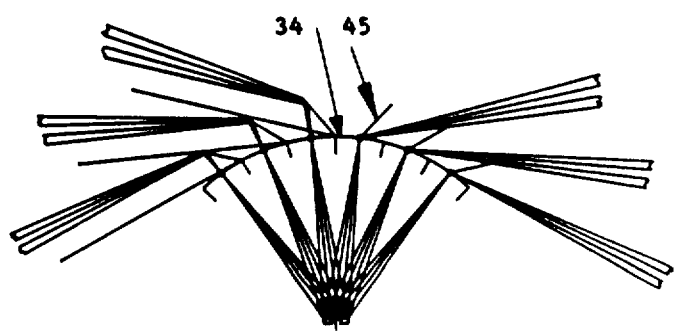
FIGS. 10 and 11 illustrate the radiation patterns and fields of view limits of the lens segments of FIG. 9.
Figure 11:
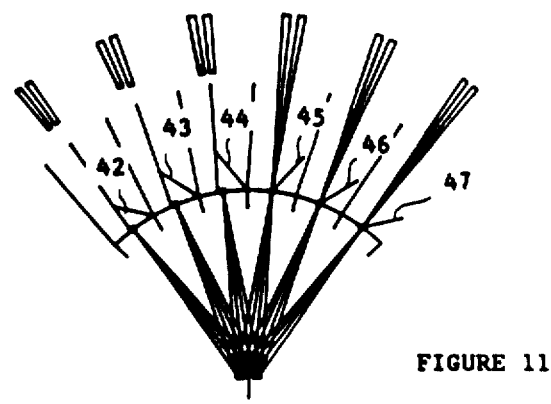

FIG. 10 illustrates the radiation patterns and fields of view limits for the half of each segment of FIG. 9 having deflected radiation patterns. FIG. 11 illustrates the radiation patterns and fields of view limits for the half of each segment of FIGS. 9 and 10 having un-deflected radiation patterns. It will be apparent that combining the covered fields of FIGS. 10 and 11 provides substantial inspection of the total 240 degree field of view.

Figure 12:
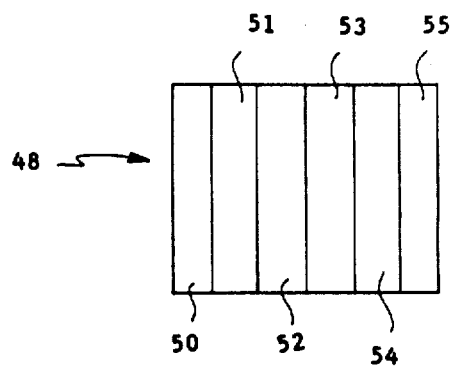
FIG. 12 is a view illustrating multiple lens segments using reflectors which entirely cover all full lens segments for the entire segment lengths.
Figure 13:
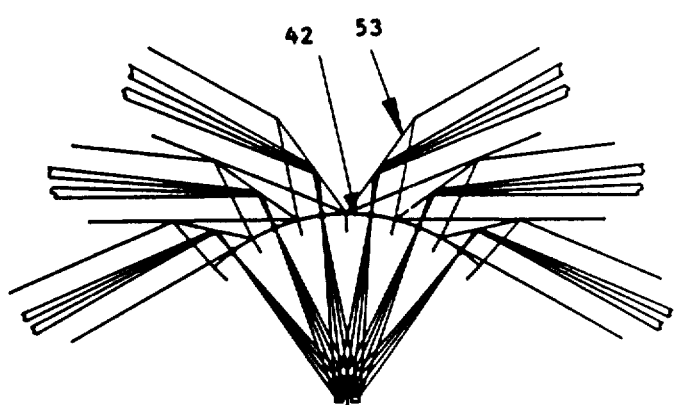
FIG. 13 illustrates the radiation patterns and fields of view limits of the lens segments of FIG. 12.

FIG. 12 is a view of a Fresnel lens system according to yet another embodiment of the present invention. The lens system is illustrated laid flat and includes multiple lens segments using reflectors 50–55 which entirely cover each lens segment for the entire segment lengths. FIG. 13 illustrates the radiation patterns and fields of view limits for each segment of the lens system of FIG. 12.

Figure 14:
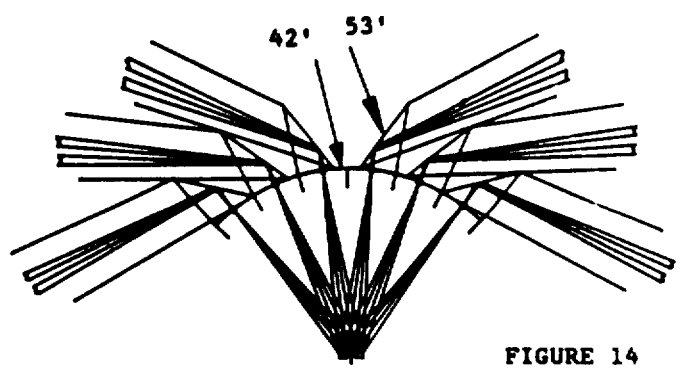
FIG. 14 illustrates the radiation patterns and fields of view limits of the lens segments of another embodiment of the present invention.

The embodiment of FIGS. 12 and 13 has an extended field of view, but does not provide substantial inspection of that field. That is, there is a large gap between the inspected region to the left and the inspected region to the right. The embodiment shown in FIG. 14 overcomes this disadvantage by using reflectors which only partially cover lens segments for full lens lengths. The extreme outer lens segments are fully covered, while the inner lens segments are only partially covered. Those portions of the inner lens segments which are only partially covered permit un-deflected rays to reach the sensor from the region missed in the embodiment of FIGS. 12 and 13.

While the invention has been disclosed with particular reference to preferred embodiments, it will be appreciated that modifications can be made to the apparatus of the invention without departing from the spirit and scope of the invention as defined by the claims. For example, several embodiments of reflector configurations have been shown. These are intended to be illustrative rather than exhaustive. A six-segment Fresnel lens system has been illustrated, but other lens structures could be used. Infrared radiation is described, but the wavelength of radiation acted upon by the optical system of the invention is not critical. Other modifications will occur to those skilled in the art.

I claim:

1. An intrusion detection device with an optically extended field of view, said device comprising:

radiation sensitive means;
a segmented lens system arranged to concentrate radiation onto the sensing means from each of a plurality of discrete fields of view extending over a predetermined arc; and
reflecting means within the field of view of each of a plurality of said lens segments for gathering radiation approaching said device from beyond said predetermined arc and for reflecting the gathered radiation onto said lens system at angles within the associated lens segment.

2. An intrusion detection device with an optically extended field of view, said device comprising:
radiation sensitive means;
a segmented lens system arranged to concentrate radiation onto the sensing means from each of a plurality of discrete fields of view extending over a predetermined arc; and
reflecting means within the field of view of each of a plurality of said lens segments for gathering radiation approaching said device from beyond said predetermined arc and for reflecting the gathered radiation onto said lens system at angles within the associated lens segment, the field of view of said reflecting means being greater than 180 degrees.

3. The device set forth in claim 2 wherein the field of view of said reflecting means is approximately 240 degrees.

4. The device set forth in claim 1 wherein said segmented lens system is a Fresnel lens array of lens segments, each lens segment being (1) angled with respect to the other so as to have its own discrete field of view and (2) positioned and angularly disposed with respect to the other lenses segments so as to share a common focal point.

5. An intrusion detection device with an optically extended field of view, said device comprising:
radiation sensitive means;
an optical system arranged to concentrate radiation onto the sensing means from a field of view extending over a predetermined arc of less than 180 degrees; and
reflecting means within the field of view of the optical system for gathering radiation approaching said device from beyond an arc of 180 degrees, and for reflecting the gathered radiation onto said optical system at angles within the field of view of the optical system.

6. An intrusion detection device with an optically extended field of view, said device comprising:
radiation sensitive means;
an optical system arranged to concentrate radiation onto the sensing means from a field of view extending over a predetermined arc; and
reflecting means on at least one side of, and within the field of view of said optical system for gathering radiation approaching said device from beyond said predetermined arc and for reflecting the gathered radiation onto said optical system at angles within the field of view of said optical system, said reflecting means being arranged to gather radiation approaching said device from the side of the field of view that the reflecting means is on, whereby the radiation does not pass across the field of view.

7. The device set forth in claim 6 wherein the field of view of said reflecting means is greater than 180 degrees.

8. The device set forth in claim 6 wherein there is a reflecting means on opposed sides of the field of view.

* * * * *